US010284596B1

(12) United States Patent
Schetina

(10) Patent No.: US 10,284,596 B1
(45) Date of Patent: *May 7, 2019

(54) CLOAKING AUTHORITY SYSTEM

(71) Applicant: INTEGRITY Security Services, Inc., Irvine, CA (US)

(72) Inventor: Erik S. Schetina, Bergenfield, NJ (US)

(73) Assignee: INTEGRITY SECURITY SERVICES LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/177,148

(22) Filed: Oct. 31, 2018

Related U.S. Application Data

(63) Continuation of application No. 15/971,045, filed on May 4, 2018, now Pat. No. 10,154,061.

(51) Int. Cl.
*G06F 21/00* (2013.01)
*H04L 29/04* (2006.01)
*H04L 29/06* (2006.01)

(52) U.S. Cl.
CPC ...... *H04L 63/1466* (2013.01); *H04L 63/0414* (2013.01); *H04L 63/0471* (2013.01); *H04L 63/1425* (2013.01); *H04L 63/0492* (2013.01)

(58) Field of Classification Search
CPC ............ H04L 63/1466; H04L 63/0471; H04L 63/1425; H04L 63/0414; H04L 63/0492
See application file for complete search history.

(56) References Cited

U.S. PATENT DOCUMENTS

| 9,461,827 | B2 | 10/2016 | Laberteaux et al. |
| 2009/0260057 | A1* | 10/2009 | Laberteaux ......... H04L 63/0823 726/2 |
| 2017/0222990 | A1* | 8/2017 | Romansky ............. H04L 63/06 |

OTHER PUBLICATIONS

Notice of Allowance and Notice of Allowability for U.S. Appl. No. 15/971,045 dated Aug. 16, 2018, pp. 1-8.

* cited by examiner

*Primary Examiner* — Lisa C Lewis
(74) *Attorney, Agent, or Firm* — MH2 Technology Law Group LLP

(57) ABSTRACT

A cloaking authority system that securely and anonymously identifies a misbehaving device based on its digital certificate. The system may include a cloaking authority server or device that is communicatively connected to a misbehavior authority server, and may also include a pseudonym certificate authority device, and a registration authority device. The cloaking authority device receives, from the misbehavior authority server, a request for a cloak index, wherein the request for the cloak index includes the linkage value from a PC of a misbehaving computerized device. The cloaking authority device processes the linkage value to produce a cloak index, which identifies the misbehaving computerized device and which is unique and anonymous, and transmits it to the requesting misbehavior authority server. The misbehavior authority server uses the cloak index to identify the specific computerized device that has misbehaved, usually repeatedly.

20 Claims, 5 Drawing Sheets

CLOAKING AUTHORITY SYSTEM

CROSS REFERENCE TO RELATED APPLICATIONS

This application is a continuation of U.S. application Ser. No. 15/971,045 filed on May 4, 2018, which is hereby incorporated by reference in its entirety.

FIELD OF THE INVENTION

This invention relates to the systems, devices, and methods for the secure, anonymous identification of computerized devices, such as Internet-of-Things devices, vehicles, or transportation infrastructure devices, that are behaving anomalously.

BACKGROUND

As computers have become ever more miniaturized and commoditized, manufacturers are producing more and more varied devices that include one or more embedded computer or processor. The computer in a computerized device can control the device's operation; collect, store, and share data; communicate with other computers and other computerized devices; and update its own software, among other things.

The Internet of things (IoT) is the network of computerized physical devices that have embedded processor(s), electronics, software, data, sensors, actuators, and/or network connectivity, which enable these devices to connect and exchange data via digital networks, including the Internet, cellular networks, and other wireless networks. Typically, each "thing" is uniquely identifiable through its embedded computing system, and is able to communicate and inter-operate within the existing Internet infrastructure.

"Things", in the IoT sense, can refer to a wide variety of computerized devices, such as consumer appliances, enterprise devices used in business and corporate settings, manufacturing machines, farming equipment, energy-consuming devices in homes and buildings (switches, power outlets, bulbs, televisions, etc.), medical and healthcare devices, infrastructure management devices, robots, drones, and transportation-related devices and vehicles, among many others.

For example, most, if not all, modern vehicles (e.g., cars, trucks, aircraft, trains, watercraft, and the like) contain several embedded processors or embedded computers in their subsystems, and are computer-controlled in at least some aspects. Similarly, a growing number of modern transportation infrastructure devices (e.g., traffic lights, traffic cameras, traffic sensors, bridge monitors, bridge control systems, and the like) contain at least one, and often many, embedded processors or embedded computer systems, and are computer-controlled in at least some aspects. These computer-controlled elements of the transportation network typically communicate with each other, passing various types of information back and forth, and they may react, respond, change their operation, or otherwise depend upon the information received/sent from/to other vehicles in Vehicle-to-Vehicle (V2V; also known as C2C, Car-to-Car) communications and/or from/to infrastructure elements in Vehicle-to-Infrastructure (V2I, also known as C2I, Car-to-Infrastructure) communications for safe, correct, efficient, and reliable operation. These elements, communications, actions, and interactions may be collectively referred to as a V2X environment, where X represents any device, including another vehicle.

The computers in computerized devices operate according to their software and/or firmware and data in conjunction with the operation of their hardware, (such as processors, memory, busses, etc.), and the input data that the computerized devices use, (such as data from other devices; for example, location data (e.g., from a GPS device), speed data, braking data, time data, temperature data, etc.). Problems with software, data, hardware, or inputs can cause a computerized device to operate in an aberrant or anomalous manner, such that the device behaves in a way that deviates from its standard, normal, or expected behavior. Such problems may be unintentional, such as a problem caused by the failure of a hardware device or an unintentional bug in software; or intentional, such as a problem caused by unauthorized persons or organizations (e.g., hackers) replacing or changing the software in a computerized device.

Accordingly, it is desirable to provide improved systems, methods and techniques for securely identifying computerized devices that are behaving in an anomalous or aberrant manner, for example, in order to reduce or stop the effects of their misbehavior on other devices and their environment.

SUMMARY

Disclosed herein are systems, methods and devices system for identifying a misbehaving computerized device. In some implementations, the system includes a misbehavior authority device that receives a report about the misbehaving computerized device, wherein the report includes a pseudonym certificate from the misbehaving computerized device, and wherein the pseudonym certificate includes a linkage value; and a cloaking authority device that is communicatively connected to the misbehavior authority device, and that receives a request for a cloak index from the misbehavior authority device, wherein the request for the cloak index includes the linkage value. The cloaking authority device may process the linkage value to produce a cloak index, which identifies the misbehaving computerized device, and then may transmit the cloak index to the misbehavior authority device. The misbehavior authority device may receive the cloak index from the cloaking authority, and determine, using the cloak index, that a specific computerized device has misbehaved; e.g., repeatedly misbehaved.

In various implementations, the misbehavior authority device may direct a plurality of computerized devices to ignore the specific computerized device that has repeatedly misbehaved.

In various implementations, the cloaking authority device may process the linkage value to produce the cloak index by obtaining, from a pseudonym certificate authority device, first information that is used to produce the cloak index, wherein the information is associated with the linkage value. In some such implementations, the cloaking authority device processes the linkage value by obtaining, from a registration authority device, second information that is used to produce the cloak index, wherein the additional information is associated with the first information. In some implementations, the cloaking authority device processes the linkage value by: receiving, from a pseudonym certificate authority device, a hash of a pseudonym certificate request (HPCR) that caused the pseudonym certificate that corresponds to the linkage value to be generated; receiving, from a registration authority device, a hash of a linkage chain identifier that corresponds to the pseudonym certificate identified by the HPCR, wherein the hash of the linkage chain identifier identifies the misbehaving computerized device; and determining the cloak index, which is based on the linkage chain identifier and which identifies the misbehaving computerized device.

In some implementations, the cloaking authority device processes the linkage value by: transmitting to a pseudonym certificate authority device, a message that includes the linkage value; receiving, from the pseudonym certificate authority device, a message that includes a hash of a pseudonym certificate request (HPCR) that caused the pseudonym certificate to be generated; transmitting, to a registration authority device, a message that includes the HPCR; receiving, from the registration authority device, a message that includes a hash of a linkage chain identifier that corresponds to the pseudonym certificate and that identifies the misbehaving computerized device; and determining the cloak index, which is based on the linkage chain identifier and which identifies the misbehaving computerized device.

In still other implementations, a computer, such as a misbehavior authority computer may perform a method for identifying a misbehaving computerized device and a non-transitory computer-readable media may include instructions, that when executed by a processor, perform a method for identifying a misbehaving computerized device. In such implementations, the method may include operations for receiving a report about the misbehaving computerized device, wherein the report includes a pseudonym certificate from the misbehaving computerized device, and wherein the pseudonym certificate includes a linkage value; transmitting, to a cloaking authority, a request for a cloak index that corresponds to the misbehaving computerized device, wherein the request for the cloak index includes the linkage value from the pseudonym certificate from the misbehaving computerized device; receiving the cloak index from the cloaking authority; and determining, using the cloak index, that a specific computerized device has repeatedly misbehaved. In such implementations, the cloaking authority may transmit, to a pseudonym certificate authority, a message including the linkage value, wherein the pseudonym certificate authority determines a hash of a pseudonym certificate request (HPCR) that caused the pseudonym certificate to be generated; receive, from the pseudonym certificate authority, a message including the HPCR; transmit, to a registration authority, a message including the HPCR; receive, from the registration authority, a message including a hash of a linkage chain identifier that corresponds to the pseudonym certificate and that identifies the misbehaving computerized device; and determine the cloak index, which corresponds to the linkage chain identifier and which identifies the misbehaving computerized device. In various such implementations, the misbehavior authority computer may also direct a plurality of computerized devices to ignore the specific computerized device that has repeatedly misbehaved.

In various implementations, the cloaking authority may determine the cloaking index by creating, using the hash of the linkage chain identifier as a seed in a random number generator, a random number as the cloak index. In various implementations, the cloaking authority may store the cloak index that was determined in a cloak index table; and store the hash of the linkage chain identifier in the cloak index table in association with the cloak index. In some such implementations, the cloaking authority may determine the cloaking index by accessing the cloak index from the cloak index table based on the hash of the linkage chain identifier.

Yet other implementations may include a system for identifying a misbehaving computerized device that includes a memory containing instructions and a processor, operably coupled to the memory, that executes the instructions to perform operations. The operations may comprise receiving, from a misbehavior authority, a request for a cloak index that corresponds to the misbehaving computerized device, wherein the request for the cloak index includes a linkage value from a pseudonym certificate from the misbehaving computerized device; transmitting, to a pseudonym certificate authority, a message including the linkage value, wherein the pseudonym certificate authority determines a hash of a pseudonym certificate request (HPCR) that caused the pseudonym certificate to be generated; receiving, from the pseudonym certificate authority, a message including the HPCR; transmitting, to a registration authority, a message including the HPCR; receiving, from the registration authority, a message including a hash of a linkage chain identifier that corresponds to the pseudonym certificate and that identifies the misbehaving computerized device; determining the cloak index, which corresponds to the linkage chain identifier and which identifies the misbehaving computerized device; and transmitting the cloak index to the misbehavior authority.

In further implementations, the operation of determining the cloak index may further include creating a random number as the cloak index. In some such implementations, that may include creating the random number using the hash of the linkage chain identifier as a seed in a random number generator.

In various implementations, the system's operations may further include storing the cloak index that was determined in a cloak index table; and storing the hash of the linkage chain identifier in a cloak index table in association with the cloak index. In some such implementations, the cloak index may be determined by accessing the cloak index from the cloak index table based on the hash of the linkage chain identifier.

In yet other implementations, the system's operations may further include storing, in the cloak index table, a query time in association with the cloak index and the hash of the linkage chain identifier; updating the query time whenever the cloak index is accessed; and deleting the cloak index and the hash of the linkage chain identifier and the query time from the cloak index table after a predetermined amount of time passes after the query time.

In various implementations of the systems and methods and devices, the computerized device is a vehicle.

BRIEF DESCRIPTION OF THE DRAWINGS

The accompanying drawings, which are incorporated into and constitute a part of this specification, illustrate implementations of the invention and together with the description, serve to explain the principles of the invention. In the figures.

DETAILED DESCRIPTION

Figure 1:
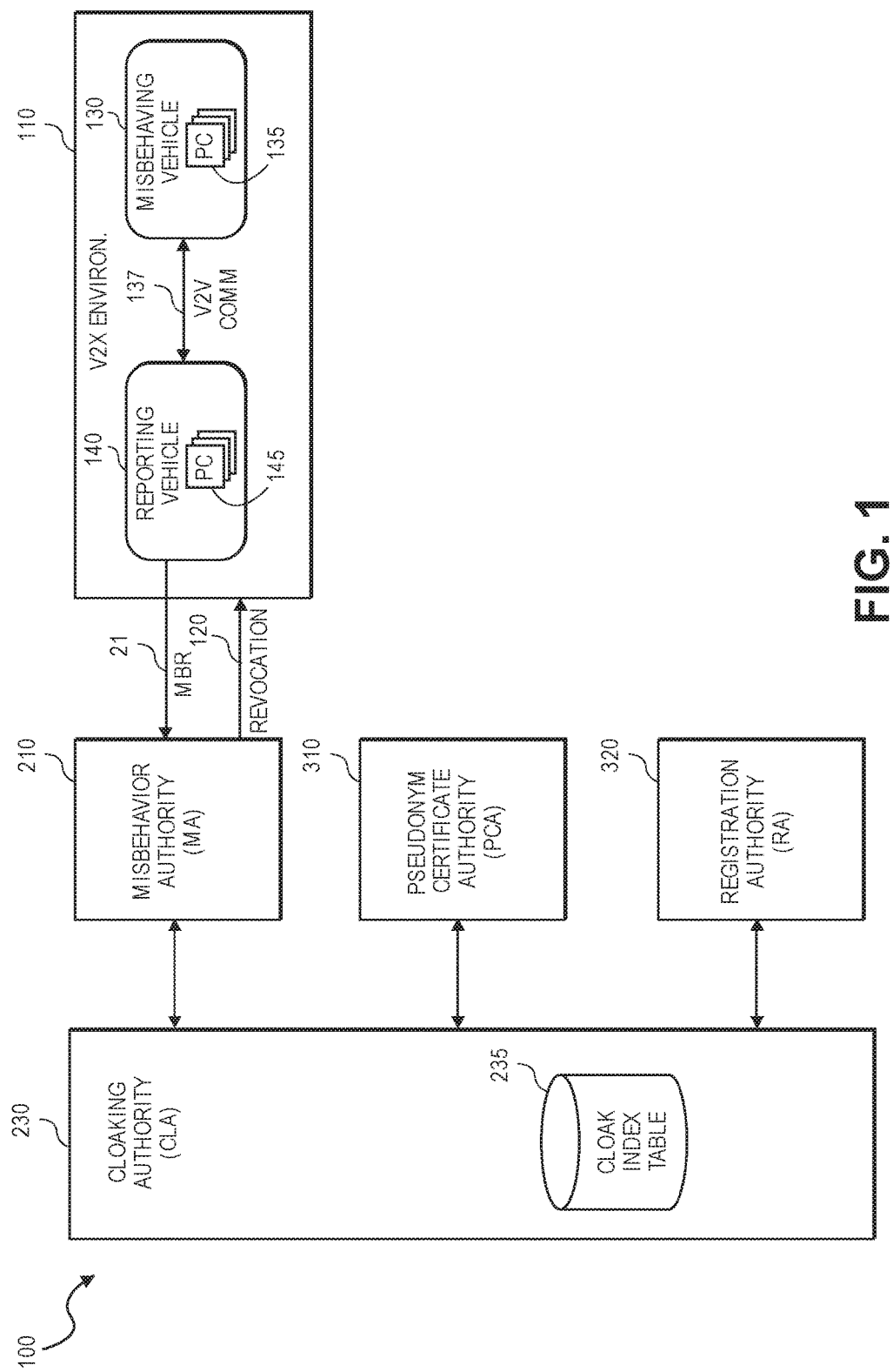
FIG. 1 is a block diagram showing an example of a system for a cloaking authority, which can securely and anonymously identify a computerized device, such as a vehicle, consistent with implementations of the invention.

Reference will now be made in detail to various implementations of the invention, examples of which are illustrated in the accompanying drawings. Wherever convenient, the same reference numbers will be used throughout the drawings to refer to the same or like parts.

Although the following description uses vehicular and transportation-infrastructure computerized devices (such a vehicles with OBUs and ECUs; and RSUs) as specific examples for clarity of explanation, the invention is not limited to those specific types of devices. Various implementations consistent with the invention may be used with and for a wide variety of computerized devices, such as medical devices (e.g., dialysis machines, infusion pumps, etc.); robots; drones; autonomous vehicles; various Internet of Things (IoT) devices; and wireless communication modules (e.g., embedded Universal Integrated Circuit Cards (eUICC)), among others.

Vehicle to vehicle (V2V) is an automobile technology designed to allow automobiles to communicate with each other. Vehicle to Infrastructure integration (V2I) is a series of technologies that link road vehicles to their physical surroundings. Both technologies together may be referred to as a V2X environment, which includes a primary goal of improving road safety.

In the V2X environment, a security asset (e.g., a digital asset related to security, such as pseudonym certificate) can be used to authorize and enable an entity (e.g., a V2X device, such as a vehicle) to participate and communicate in the V2X environment. Unlike traditional X.509 certificates, the pseudonym certificates do not carry the identity of their entity within them; thus, an external observer cannot link their use with a particular vehicle or device. Additionally, after initial installation at manufacturing time, the security assets used in the V2X devices, including pseudonym certificates, are periodically changed and replenished or re-provisioned during the devices' operational lives.

This creates several technical problems in trying to match a given pseudonym certificate to the correct V2X device that used it; or in other words, in trying to identify the correct device (e.g., vehicle) that used a given pseudonym certificate.

Members of the V2X environment, such as cars and trucks, may behave in an anomalous or aberrant manner, which may be referred to as misbehaving or misbehavior. Misbehaving vehicles are typically detected by other members of the V2X environment; e.g., by other vehicles or by transportation infrastructure devices. In the V2X environment, however, the only available "identification" of a misbehaving vehicle is its pseudonym certificate(s), which are received by the detecting vehicle in communications from the misbehaving vehicles When a vehicle, or other member of the V2X environment, misbehaves, then it is desirable to identify the vehicle and to reduce or stop undesirable or negative effects caused by its misbehavior, for example by "removing" the misbehaving device from the V2X environment. A misbehaving vehicle may negatively affect the V2X environment by, for example, communicating erroneous, false, or misleading information to other vehicles or infrastructure devices, which may cause the other vehicles or devices to act or react inappropriately. One example of a way to remove a misbehaving vehicle from the V2X environment is to notify or direct the other members of the V2X environment (e.g., other cars and trucks and infrastructure devices) to disregard or ignore communications from the misbehaving vehicle.

FIG. 1 is a block diagram showing an example of a system 100 for identifying misbehaving vehicles 130 using a cloaking authority 230, which is consistent with implementations of the invention. As shown in the example of FIG. 1, the system 100 includes a conventional V2X environment 110, which includes reporting vehicles 140, each of which has a group of unique pseudonym certificates (PCs) 145 assigned to it, and misbehaving vehicles 130, each of which has a group of unique PCs 135 assigned to it, as is known in the art.

A reporting vehicle 140 may receive wireless V2V communications 137 from a misbehaving vehicle 130, and the V2V communications 137 may include the currently in-use PC 135 of the misbehaving vehicle 130. Based on the V2V communications 137, the reporting vehicle 140 may determine that the misbehaving vehicle 130 is acting in an aberrant or anomalous manner. For example, the reporting vehicle 140 may detect and be triggered to report misbehavior by the vehicle 130 when the vehicle 130 communicates data or information that conflicts with or is incompatible with the data and information known to the reporting vehicle 140, for example, when the misbehaving vehicle 130 claims to occupy the same physical space as another vehicle on the road; i.e., the misbehaving vehicle 130 communicates 137 its GPS coordinates as being the same coordinates communicated by another vehicle or the same coordinates as the reporting vehicle 140. In some other examples, the reporting vehicle 140 may report misbehavior when it detects that the misbehaving vehicle 130 claims to be in a location that the camera of the reporting vehicle 140 senses as being unoccupied, or when it detects that the misbehaving vehicle 130 claims to be travelling at an implausible speed (e.g. 200 mph), or when it detects other aberrant or anomalous data or information from the misbehaving vehicle 130.

Upon detecting the misbehavior, the reporting vehicle 140 may wirelessly send a misbehavior report (MBR) 21 to a misbehavior authority (MA) 210, as is known in the art. The MBR 21 contains the currently in-use PC 145 of the reporting vehicle 140, and the currently in-use PC 135 of the misbehaving vehicle 130, among other things.

The MA 210 may be implemented as a server or other computer (e.g., a device having at least one processor and associated memory). In various implementations, the MA 210 functions to receive, log, and process MBRs 21 from the devices in the V2X environment 110, and to make decisions related to protecting the V2X environment 110 from the misbehaving vehicle 130, for example, by revoking 120 the communication privileges and/or other privileges of the misbehaving vehicles 130 within the V2X environment 110. In other words, the misbehaving vehicle 130 is removed, in a virtual sense, from the V2X environment 110. In various implementations consistent with the present disclosure, the MA 210 also securely communicates with a cloaking authority (CLA) 230 in order to obtain an identifier for the misbehaving vehicle 130, where the identifier can be used to classify the vehicle 130 as misbehaving based on a "global" group or series of MBRs 21 and/or to take remedial action against the misbehaving vehicle 130. In various implementations, the MA 210 may also perform recording or logging functions, such as storing information reflecting the communications received by the MA 210, (such as the MBRs 21 and the cloak-index response 43 received by the MA 210);

the communications transmitted by the MA 210, (such as cloak-index requests 23 sent to the CLA 230); the remedial actions taken by the MA 210, (such as revocation messages or commands 120 sent by the MA 210); and the like.

The CLA 230 may be implemented as a server or other computer (e.g., a device having at least one processor and associated memory). In various implementations, and as explained in detail below, the CLA 230 functions to interact with a pseudonym certificate authority (PCA) 310 and a registration authority (RA) 320 to obtain data that identifies the misbehaving vehicle 130 from its PC 135. The CLA 230 also generates a unique identifier from the data, where the unique identifier also identifies the misbehaving vehicle 130. In the examples shown, the unique identifier may be referred to as a cloak index and may be stored in a cloak index table 235. Although described as a table herein, in various implementations the cloak index table 235 may be implemented as any type of data structure or data associated with each other. The CLA 230 also communicates the generated unique identifier for the misbehaving vehicle 130 (e.g., the cloak index) to the MA 210. In various implementations, the CLA 230 may also perform recording or logging functions, such as storing information reflecting the communications received by the CLA 230, (such as cloak-index requests received by the CLA 230); the communications transmitted by the CLA 230, such as cloak-index responses sent to the MA210); and the like.

During operation of the system 100, a reporting vehicle 140 reports to the MA 210, via an MBR 21, a detected misbehaving vehicle 130. As is known in the art, and by design of the V2X environment 110, however, the reporting vehicle 140 cannot specifically identify the misbehaving vehicle 130, for example by make, model, VIN, license plate number, or the like. The only identification that is associated with the misbehaving vehicle 130 and known to the reporting vehicle 140 is the pseudonym certificate (PC) 135 that is included with the V2V communications 137 sent by the misbehaving vehicle 130. By design, the members of the V2X environment 110 and the MA 210 do not know which PC came from, or is associated with, which vehicle.

Again by design, the PC 135 used and transmitted by the misbehaving vehicle 130 is changed over time, for the purpose of preserving the anonymity of the vehicle 130. The same is true for all of the vehicles in the V2X environment. For example, when the reporting vehicle 140 sends a misbehavior report 21 to the MA 210, the misbehavior report 21 includes the PC 145 currently in use by the reporting vehicle 140, and the PC 145 is changed over time; i.e., a new PC 145 is periodically placed into service by the reporting vehicle 140, and the old one is no longer used.

Thus, the misbehavior report 21 does not permanently identify the offending vehicle 130 or the reporting vehicle 140 because the pseudonym certificates 135, 145 in the report 21 rotate in and out of use over time. The identities of the vehicles 130, 140 in the V2X environment 110 are purposely obfuscated by the PCs, which are designed to prevent anyone from tracking particular vehicles (and their drivers) via the vehicles' communications within the V2X environment 110.

This makes it technically difficult to detect repeated misbehavior by the same vehicle and to identify the misbehaving vehicle 130 in a manner that allows the misbehaving vehicle 130 can be removed from the V2X environment 110, if needed. Repeatedly misbehaving vehicles (e.g., vehicles that demonstrate multiple misbehaviors, which may be referred to as global misbehavior) may, for a few examples, include: a single vehicle that is reported as misbehaving by a significant number of other vehicles (e.g. more than a predetermined threshold number or more than a threshold number above the average number); a single vehicle that reports, erroneously, a significant amount of misbehavior by other vehicles (e.g. more than a predetermined threshold amount or more than a threshold amount above the average amount); a vehicle whose misbehavior reports couldn't have been generated truthfully (e.g., a vehicle that appears to send a report from California and then an hour later appears to send a report from New Jersey); and vehicles with something in common that report on misbehaviors or are reported on as misbehaving significantly more often than the norm (for example, all 2018 Ford Focuses built in a certain manufacturing plant—the misbehaviors may be indicative of a manufacturer's design, hardware, or software defect in the vehicles).

From a V2X environment standpoint, the misbehaving vehicle 130 needs to be identified positively in order to remove it from the environment 110, and from a vehicle original equipment manufacturer's (OEM) or supplier's standpoint, misbehaving vehicles 130 need to be identified positively in order to detect and correct problems in certain groups of vehicles or their on-board equipment (e.g., via a recall).

There is currently nothing in the conventional V2X environment 110 that can identify a misbehaving vehicle 130 based on the misbehavior reports 21 (e.g., based on the PCs 135 in the misbehavior reports) caused by or associated with the misbehaving vehicle 130 because the PCs 135 are technologically designed not to identify their vehicle 130 during use of the PCs 135 in the V2X environment 110. The systems, methods, and devices described in this disclosure introduce a new component—the cloaking authority (CLA) 230—which can identify a misbehaving vehicle 130 based on its misbehavior reports 21, which include its PCs 135.

After receiving the MBR 21 from the conventional V2X environment 110 (e.g., from a reporting vehicle 140), the MA 210 securely sends the MBR to the CLA 230. As explained in detail below, the CLA 230 securely contacts the PCA 310 with at least a portion of the information from the PC 135 and in response gets a hash (or other representation) of the RA-to-PCA pseudonym certificate request (HPOR) that originally generated the PC 135 when the PC 135 was created. The RA-to-PCA pseudonym certificate request originally came from the RA 320 when the PC 135 was created. The CLA 230 then securely contacts the RA 320 with the HPCR to get a representation (e.g., a hash) of the HPCR's linkage chain index (LCI), which identifies the misbehaving vehicle 130 in the sense that the LCI is associated with a single vehicle for which specific PCs were originally created.

In various implementations, using the LCI from the RA 320 as a seed, the CLA 230 generates a random valued index, which is referred to as a cloak index, which uniquely identifies the misbehaving vehicle 130 for which the PC 135 was originally created, and returns the index to the MA 210. In various implementations, the cloak index may be stored in the cloak index table 235 of the CLA 230. If the MA 210 later sends the CLA 230 another MBR 21 having a different PC 135 from the same vehicle 130, then the CLA 230 will return the same cloak index in response after processing the MBR 21.

In various embodiments, the CLA 230 may perform similar processing for the PC 145 of the reporting vehicle 140 to generate a cloak index that identifies the reporting vehicle 140. The cloak index of the reporting vehicle 140 may be used by the MA 210 to determine whether or not the reporting vehicle 140 is misbehaving, for example, by sending out erroneous MBRs 21, or by using PCs that were not generated for it.

In some embodiments, the CLA 230 may store the cloak index in the cloak index table 235 only temporarily, based on frequency of usage; i.e., frequency of MBRs 21 that map to the same cloak index. For example, if the cloak index has a resetting time to live (TTL) period of two weeks after the last matching inquiry, then if the CLA 230 does not receive a pertinent MBR 21 at least every 14 days, then the CLA 230 deletes that cloak index from the index table 235. This prevents the CLA 230 and the MA 210 from keeping vehicle-identifying information indefinitely. Thus, implementations consistent with the present disclosure may generate a temporary cloak index that provides the technical advantage of enabling the MA 210 to detect misbehavior over time by the same vehicle despite the anonymity and variability of PCs, while reducing the possibility of compromising any vehicle's anonymity over a long period.

Because the CLA 230 responds with the same cloak index for a given misbehaving vehicle 130 regardless of which PC 135 the vehicle 130 is currently using, and regardless of which PC 135 the vehicle 130 switches to over time, the MA 210 can determine, based on a group or set of MBRs 21 whether or not the particular vehicle 130 is "globally" misbehaving, even though the MBRs contain different PCs 135.

For example, if the MA 210 determines that the vehicle assigned cloak index "12345" by the CLA 230 has caused 100 MBRs from 75 different reporting vehicles, then the MA 210 may classify the "12345" vehicle as a misbehaving vehicle and may initiate remedial action, such as revocation 120. For another example, if the MA 210 determines that the vehicle assigned cloak index "23456" by the CLA 230 sent MBRs from California and from New Jersey within an hour of each other, (which may indicate that one or both of the vehicles in California or New Jersey is/are using an illegitimate PC that was not generated for it), then the MA 210 may classify the "23456" vehicle as a misbehaving vehicle and may initiate remedial action. For yet another example, if the MA 210 determines that the vehicle assigned cloak index "34567" by the CLA 230 sent MBRs reporting 1000 other vehicles as misbehaving within 24 hours, (which may indicate that the reporting vehicle "34567" is sending false or erroneous MBRs), then the MA 210 may classify the "34567" vehicle as a misbehaving vehicle and may initiate remedial action. In various implementations, remedial action may include adding the misbehaving vehicle to the certification revocation list (CAL), as is known in the art, so that the misbehaving vehicle will no longer be able to communicate with other devices in the V2X environment 110, and/or may include reporting the identity of the misbehaving vehicle(s) to the OEM.

In various implementations, in order to take remedial action against a misbehaving vehicle, the MA 210 may determine the actual linkage chain identification (LCI) of the misbehaving vehicle, which corresponds to the cloak index provided by the CLA 230. The actual linkage chain identification may be used to add the misbehaving vehicle to the CRL, or to report the misbehaving vehicle back to the OEM. In some further implementations, the system 100 may include a server, database, or the like (not shown) that stores vehicle information (e.g., VIN, make, model, device serial number, etc.) in association with the LCI for the vehicle, which may be populated at manufacturer and replenishment time, when a vehicle is provisioned with PCs. In such implementations, the MA 210 (or the CLA 230) may query this storage for make/model or other useful information to further the remedial efforts and/or report the information to the OEM, which may investigate and debug problems with the vehicle or with problematic models of vehicles.

In other implementations along similar lines, the system 100 may include a server, database, or the like (not shown) that can determine and return meta-characteristics about a group of HPCRs (or the like) that have been reported as misbehaving. Examples of such meta-characteristics include that a group of HPCRs are all from the same model vehicle, a group of HPCRs are all from vehicles that contain the same type of OBU, a group of HPCRs are all from vehicles that contain the same firmware version, and the like. Such meta-characteristics would, for example, enable OEMs to identify and correct problems or defects in vehicles of a certain type, make, model, year, etc. and in some cases the corrections may be done (e.g., using an over-the-air software update) before the vehicles are revoked or removed from the V2X environment 110 and/or recalled. Such meta-characteristics may also, for example, enable the system 100 to allow certain special vehicles, such as emergency vehicles, to remain in the V2X environment 110 even though they are misbehaving, and to notify the operators of those vehicles that the vehicles need to be repaired to correct the misbehavior.

One of ordinary skill will recognize that the components, processes, data, operations, and implementation details shown in FIG. 1 are examples presented for conciseness and clarity of explanation. Other components, processes, implementation details, and variations may be used without departing from the principles of the invention, as this example is not intended to be limiting and many variations are possible. For example, although only one misbehaving vehicle 130, only one reporting vehicle 140, only one MA 210, and only one CLA 230 are shown in FIG. 1, other implementations may have any number of each of these entities.

Figure 2:
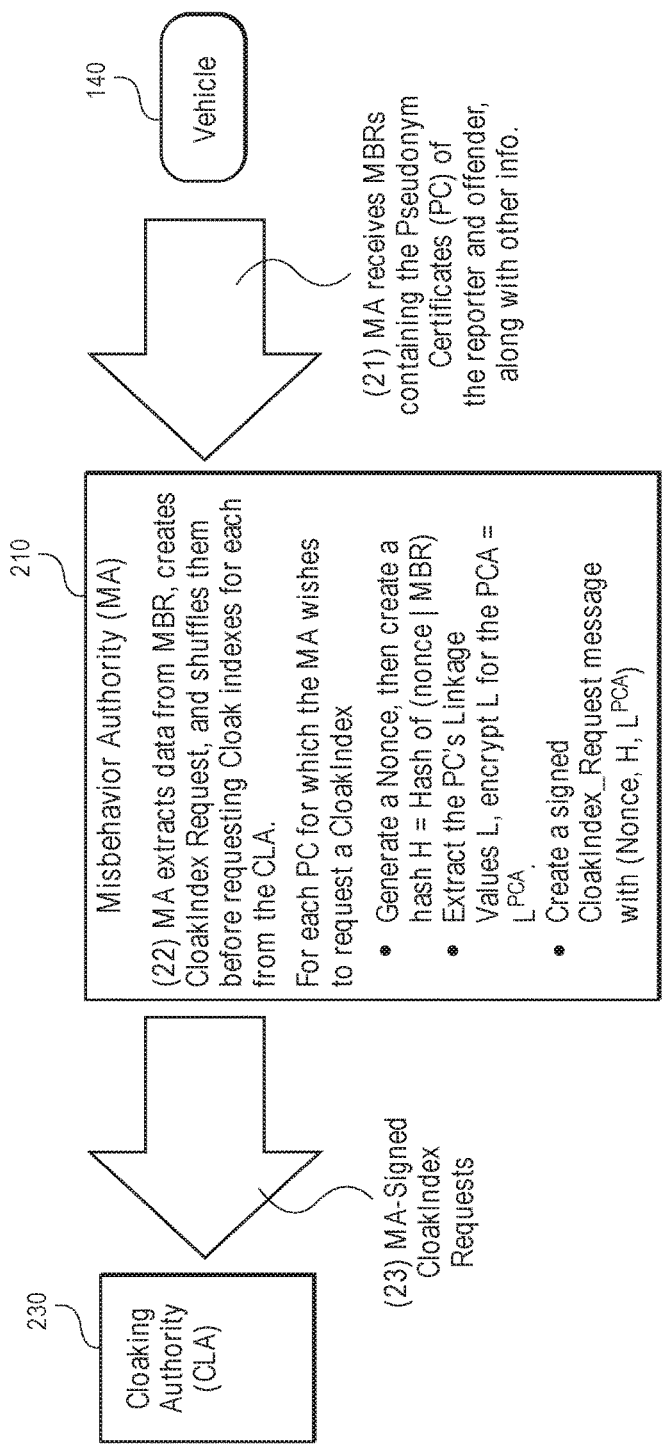
FIG. 2 is a block diagram illustrating an example of generating a cloak index request in a system for a cloaking authority, consistent with implementations of the invention.

FIG. 2 is a block diagram illustrating an example of the components and process for generating a cloak index request in a system for a cloaking authority, consistent with implementations of the invention.

As shown in this example, a vehicle 140 transmits a MBR 21 to the MA 210, which receives and processes the MBR 21. The MBR 21 contains the PC 145 of the reporting vehicle 140 and the PC 135 of the offender, i.e., of the misbehaving vehicle 130. In various implementations the MBR 21 contains other data, such as information describing the type of report; location information, information describing the anomalous action of the misbehaving vehicle 130, time information, information about V2V communications between the vehicles, and the like.

The MA 210 extracts data from the received MBR 21 and processes the data to create a cloak-index request 23 for the CLA 230.

In some implementations, as shown in FIG. 2, the MA 210 may extract the PC 135 of the misbehaving vehicle 130 (and/or the PC 145 of the reporting vehicle 140) from the MBR 21 and then extract a linkage value L from the PC 135. The MA 210 may encrypt the linkage value $L^{PCA}$ for the PCA 310; i.e., using a key from the PCA 310 so that only the PCA 310 can decrypt the linkage value $L^{PCA}$. In various implementations, the $L^{PCA}$ may include a timestamp so that the $L^{PCA}$ or the cloak-index request 23 containing the $L^{PCA}$ cannot be reused by an unauthorized person who intercepts or compromises the cloak-index request 23 to make their own requests to the CLA 230 in a replay attack or the like.

The linkage value is used by the system 100 to anonymously identify the vehicle from which the PC 135 came; the linkage value links a PC back to the vehicle or device to which the PC was issued or provisioned, although it does not provide a direct or straightforward linkage because the V2X environment 110 is designed to maintain vehicle anonymity. The linkage value can also be used by vehicles in the V2X environment 110 to determine whether the device associated with the linkage value is on a certificate revocation list (CRL), and if so to ignore its communications.

In some implementations, as shown in FIG. 2, the MA 210 also generates a cryptographic nonce, which is combined with the MBR 21 and hashed, and in some implementations the hash output H may be used for system accounting or auditing purposes.

In the example shown, the MA 210 creates a cloak-index request message 23 that contains the nonce, the hash H of the nonce and the MBR 21, and the encrypted pseudonym certificate's linkage value $L^{PCA}$. By hashing the MBR 21 and encrypting the PC 135's linkage value $L^{PCA}$, the MA 210 prevents the CLA 230 from having any vehicle-identifying information because that information is encrypted for the PCA 310 and the CLA 230 does not have the key to decrypt it. Because the linkage value is encrypted for the PCA, the CLA 230 cannot obtain any information about the PC—all the CLA 230 knows is that the MA 210 sent it a cloak-index request 23.

To secure the cloak-index request 23, the MA 210 may cryptographically sign the cloak-index request 23 using its cryptographic key.

After processing the received MBR 21 to create the cloak-index request message 23, the MA 210 transmits the cloak-index request message 23 to the CLA 230.

With respect to the accounting or auditing uses of the hashed MBR 21, in some implementations, the hashed MBR 21 allows an auditor to match cloak-index requests 23 that were received and logged by the CLA 230 with the corresponding MBRs 21 that were received and logged by the MA 210 and to verify that every cloak-index requests 23 was triggered by a MBR 21. This type of accounting or auditing may be done periodically (e.g., ever three months or every six months or the like) and would detect a situation where the MA 210 has been compromised or is malfunctioning and is sending cloak-index requests 23 that are not based on a MBR 21, e.g., a cloak-index request 23 that uses a PC from any vehicle, whether misbehaving or not.

Figure 3:
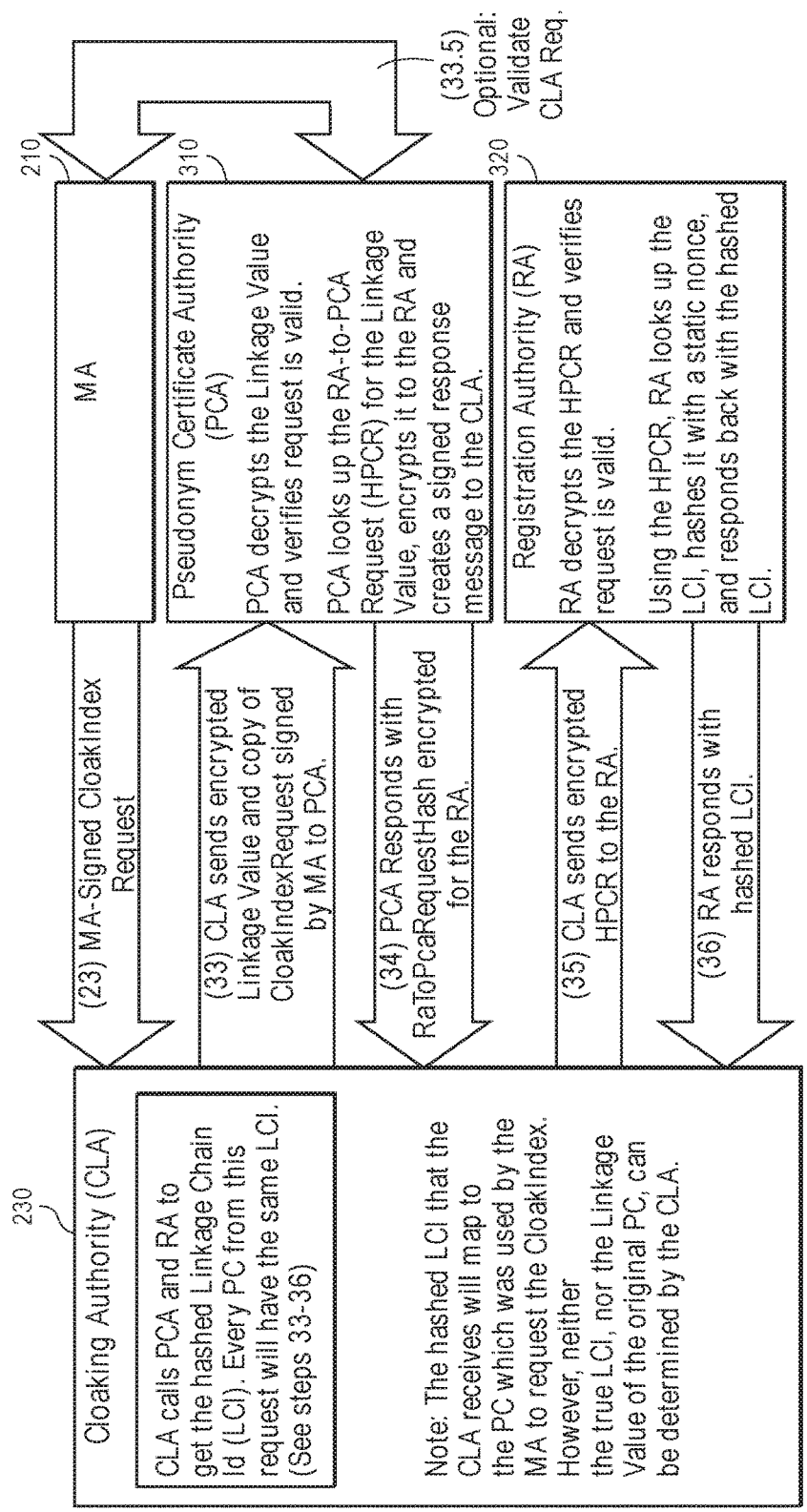
FIG. 3 is a block diagram illustrating an example of requesting a hash of a pseudonym certificate in a system for a cloaking authority, consistent with implementations of the invention.

FIG. 3 is a block diagram illustrating an example of a process for a request for a hash of a pseudonym certificate in a system for a cloaking authority, consistent with implementations of the invention. As shown in this example, the CLA 230 receives the cloak-index request 23, and as explained in more detail below, the CLA 230 communicates with the PCA and the RA to get a hashed linkage chain identification (hashed LCI), which is an indicator, such as a unique number, that identifies a specific vehicle based on the PCs assigned to that vehicle, because every PC assigned to a given vehicle (or device) has the same LCI. An LCI has a one-to-one correspondence with a vehicle (or device) and distinguishes a given vehicle from all of the other vehicles and devices in the V2X environment 110.

As shown in this example, the CLA 230 transmits 33 the encrypted linkage value $L^{PCA}$ and a copy of the cloak-index request 23 signed by the MA 210 to the PCA 310. The encrypted linkage value $L^{PCA}$ can only be decrypted by the PCA 310.

The PCA 310 decrypts the linkage value $L^{PCA}$ and verifies that the cloak-index request 23 is valid by verifying the cryptographic signature of the MA 210 on the cloak-index request 23, which ensures that the cloak-index request 23 was originated by the MA 210. In some implementations, the PCA 310 may optionally communicate 33.5 with the MA 210 after receiving the cloak-index request 23 and request that the MA 210 verify that it sent that cloak-index request 23 before the CLA 310 processes the request 23 and 33. This option would prevent the PCA 310 from responding to a fake or unauthorized cloak-index request 23 that did not truly come from the MA 210.

The PCA 310 looks up the hash of the RA-to-PCA pseudonym certificate request (HPCR) using the decrypted linkage value L, for example, as an index.

As is known in the art, this look-up is based on the way pseudonym certificates are generated and provisioned in the standard V2X environment 110. With respect to the background workings of the V2X environment 110, at vehicle manufacture time and at subsequent PC replenishment times, a vehicle sends a request to the RA 320 to get a bundle or group of PCs (e.g., the group of PCs 135) from the RA 320. The RA 320 interacts with the PCA 310 and two linkage authorities (not shown) to generate and provide the bundle of PCs to the requesting vehicle. For example, a given vehicle 130 may send an initial request for a group or bundle of 3000 PCs 135 to the RA 320 at vehicle manufacture time, and in response the RA 320 may create and send 3000 individual RA-to-PCA requests for a PC to the PCA 310. In order to correlate the resulting PCs with the requesting vehicle 130, the RA 320 hashes each individual RA-to-PCA request for a PC, which creates a hash result representing the RA-to-PCA request (referred to as an HPCR), and includes the hash result (i.e., the HPCR) with each of the 3000 RA-to-PCA requests that it sends to the PCA 310. In addition, the RA 320 assigns at least one linkage chain ID (LCI) to the requesting vehicle 130, and stores all of the HPCRs generated for the vehicle 130 in association with that LCI(s), such that every HPCR for a given vehicle is associated with the same LCI(s) and such that the RA 320 can look up the LCI(s) using an HPCR. Note that although the conventional RA 320 of the current V2X environment uses two LCIs, for ease and clarity of explanation, the examples used herein generally refer to only one LCI. Implementations consistent with the invention, nonetheless, include implementations that use two or more LCIs.

At about the same time as the vehicle 130, other new vehicles are requesting bundles of PCs from the RA 320 along with vehicle 130, and thus the RA has to fulfill a large number of requests. For instance, if a thousand vehicles each ask for 3000 PCs, then the RA 320 will send 3,000,000 RA-to-PCA requests for individual PCs to the PCA 310. The RA 320 will typically shuffle the order of the RA-to-PCA requests so that the PCA 310 cannot correlate any group or sequence of RA-to-PCA requests with any particular vehicle or with each other.

In response to each RA-to-PCA request, the PCA 310 creates a new PC. When it creates a new PC, which includes a linkage value L, the PCA 310 stores the linkage value L in association with the HPCR that was included in each request and in a manner that allows the PCA 310 to look up the HPCR using the linkage value L. The PCA 310 sends the newly created PC to the RA 320. The PCA 310 may encrypt each PC for the vehicle (i.e., so that it can only be decrypted by the vehicle) such that the RA 320 cannot see the contents of the PC.

Because the RA 320 receives each PC in response to a RA-to-PCA request that it made to the PCA 310, and because each RA-to-PCA request it made to the PCA 310 was correlated, using the HPCR, to a PC bundle request received from a specific vehicle 130 via the LCI, the RA 320 can determine which PCs 135 were generated for and go to that specific vehicle 130. Thus, the hash of the RA-to-PCA request (the HPCR) is information that allows the RA 320 to correlate a newly created PC with a specific vehicle and to provision the newly created PC to that specific vehicle.

Concluding the discussion of the background workings of the V2X environment 110 and referring again to the example shown in FIG. 3, using the decrypted linkage value L, the PCA 310 consults its stored records and looks up or otherwise determines the hashed RA-to-PCA request (HPCR) that it received from the RA 320 and in response to which it created the PC that contains the linkage value L. After it retrieves the HPCR that corresponds to the PC that contains to linkage value L, the PCA 310 encrypts a copy of the HPCR for the RA 32, (so that, e.g., the CLA 230 cannot access the HPCR), and the PCA 310 transmits 34 the encrypted HPCR to the CLA 230.

The CLA 230 receives the message with the encrypted HPCR and transmits 35 the encrypted HPCR to the RA 320.

The RA 320 receives that message and decrypts the encrypted HPCR to verify that the message is valid. The RA 320 then uses the decrypted HPCR to look up the stored linkage chain ID(s) (LCI) that corresponds to the HPCR, and that indicates the vehicle to which the RA-to-PCA request maps. Referring to the earlier example where the vehicle 130 requested a group of 3000 PCs at manufacture time, the RA 320 would have stored 3000 HPCRs that map to the same LCI and thus to the same vehicle 130. In various implementations, the LCI may be or represent actual information about the identity of the vehicle 130 within the V2X environment 110 (and in some embodiments, using information outside of the conventional V2X environment 110, the LCI may be mappable to real world identification information, such as a vehicle ID number, etc.). In order to keep that information secure, the RA 320 may hash the LCI with a static cryptographic nonce before responding to the CLA 230. The RA 320 then responds by transmitting 36 the hashed LCI to the CLA 230. Because both of the inputs are deterministic (i.e., the LCI does not change and the static nonce does not change), the hash algorithm will produce the same hash value every time it is run for a given vehicle 130 (i.e., for the LCI associated with a given vehicle). Thus, the CLA 230 (and other entities) cannot tell what the value of the LCI was, but it can tell from the hash value that it was the same LCI.

The hashed LCI that the CLA 230 receives maps or corresponds to the PC which was used by the MA 210 in the cloak-index request 23. However, neither the true LCI nor the linkage value of the PC from the vehicle 130, 140 can be determined by the CLA 230 because that information is securely encrypted as it passes through the CLA 230.

Figure 4:
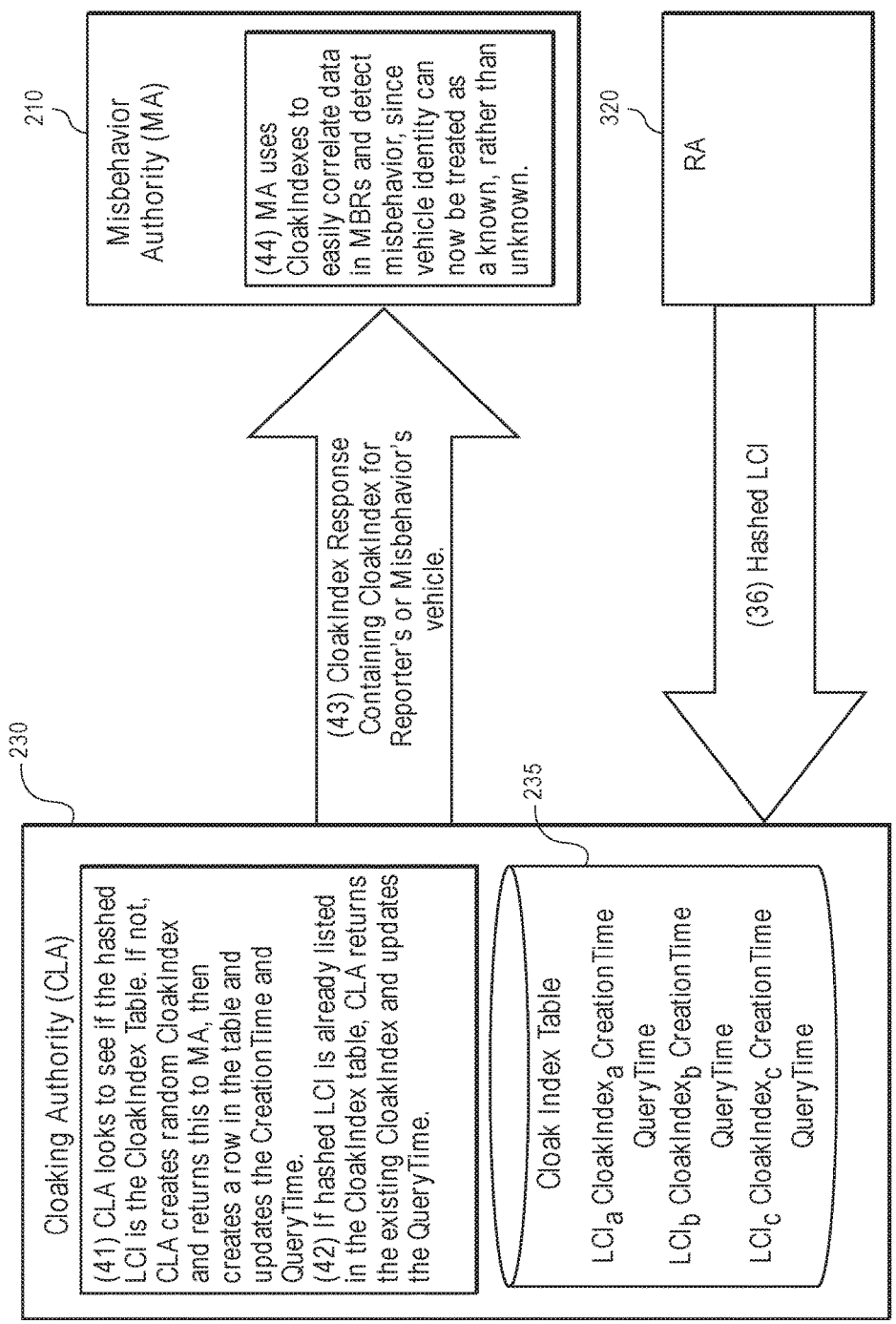
FIG. 4 is a block diagram illustrating an example of generating a cloak index that identifies a computerized device in a system for a cloaking authority, consistent with implementations of the invention.

FIG. 4 is a block diagram illustrating an example of a process for generating a cloak index in a system for a cloaking authority, consistent with implementations of the invention. As shown in this example, the CLA 230 looks to see if a hashed LCI that was received 36 from the RA 320 is in the cloak index table 235 (e.g., in other words, has the MA 210 previously sent a request 23 that corresponded to this hashed LCI).

If the received hashed LCI is not stored in the cloak index table 235, then the CLA 230 creates a new, random cloak index that corresponds to the received hashed LCI and transmits the new cloak index to the MA 210 in a response message 43. The CLA 230 also stores a copy of the new cloak index in the cloak index table 235. In various implementations, the CLA 230 may store the new cloak index by adding a row to the cloak index table 235, where the row includes information or fields that hold the hashed LCI, the new cloak index, the creation time and date of the new cloak index and the most-recent query time and date for the new cloak index, (which may be the same as the creation time and date when the new cloak index is initially added to the table).

If, on the other hand, the received hashed LCI 36 is already stored in the cloak index table 235, then the CLA 230 finds the corresponding, previously generated cloak index in the same row of the cloak index table 235, transmits that cloak index to the MA 210 in a response message 43, and updates the query time corresponding to that cloak index in the cloak index table 235.

In various implementations, when a cloak index (e.g., a row) in the cloak index table 235 has not been queried for a predetermined amount of time after the last query time (e.g. a predetermined TTL time such as six days, two weeks, three weeks, one month, or the like), the CLA 230 may delete that cloak index's entry (e.g., row) from the cloak index table 235. In such implementations, the CLA 230 does not keep records for a cloak index, (which corresponds to a hashed LCI, which corresponds to a specific vehicle), for an indefinite amount of time.

In some implementations in which the range of the values of the cloak index is limited to relatively small number of bits (e.g., 8 or 16), the CLA 230 may reuse cloak indexes as cloak index rows (which indirectly correspond to specific vehicles), are aged out of the cloak index table 235 according to the predetermined TTL value. In such implementations, after the CLA 230 deletes a row, the CLA 230 may generate a new random cloak index sometime in the future that could be the same as a cloak index that it has used before. And in such implementations, the response 43 to the MA 210 may indicate whether the cloak index is being reused, such that the MA 210 can treat the reused cloak index as corresponding to a different vehicle than the vehicle to which the reused cloak index previously corresponded.

Among others, a new technical advantage of the systems and processes described above with respect to FIGS. 1-4 is that the CLA 230 never gets any unencrypted information about any of the vehicles and it cannot decrypt the information that passes through it. Because of this secure and anonymous handling of the identifying information, if the CLA 230 were compromised by a malicious actor, the malicious actor could not track or learn anything about any of the vehicles and devices in the V2X environment 110. Nor could the malicious actor use the CLA 230 to trigger processing in the MA210, the PCA 310 or the RA 320 because the CLA 230's processing requires the MA 210 to cryptographically sign the message 33 that the CLA 230 passes to the PCA 310. Because the CLA 230 cannot cryptographically sign messages as if it was the MA 210, the PCA 310 will not process or react to any message that the CLA signs on its own.

One of ordinary skill will recognize that the components, processes, data, operations, and implementation details shown in FIGS. 2-4 are examples presented for conciseness and clarity of explanation. Other components, processes, implementation details, and variations may be used without departing from the principles of the invention, as this example is not intended to be limiting and many variations are possible.

Figure 5:
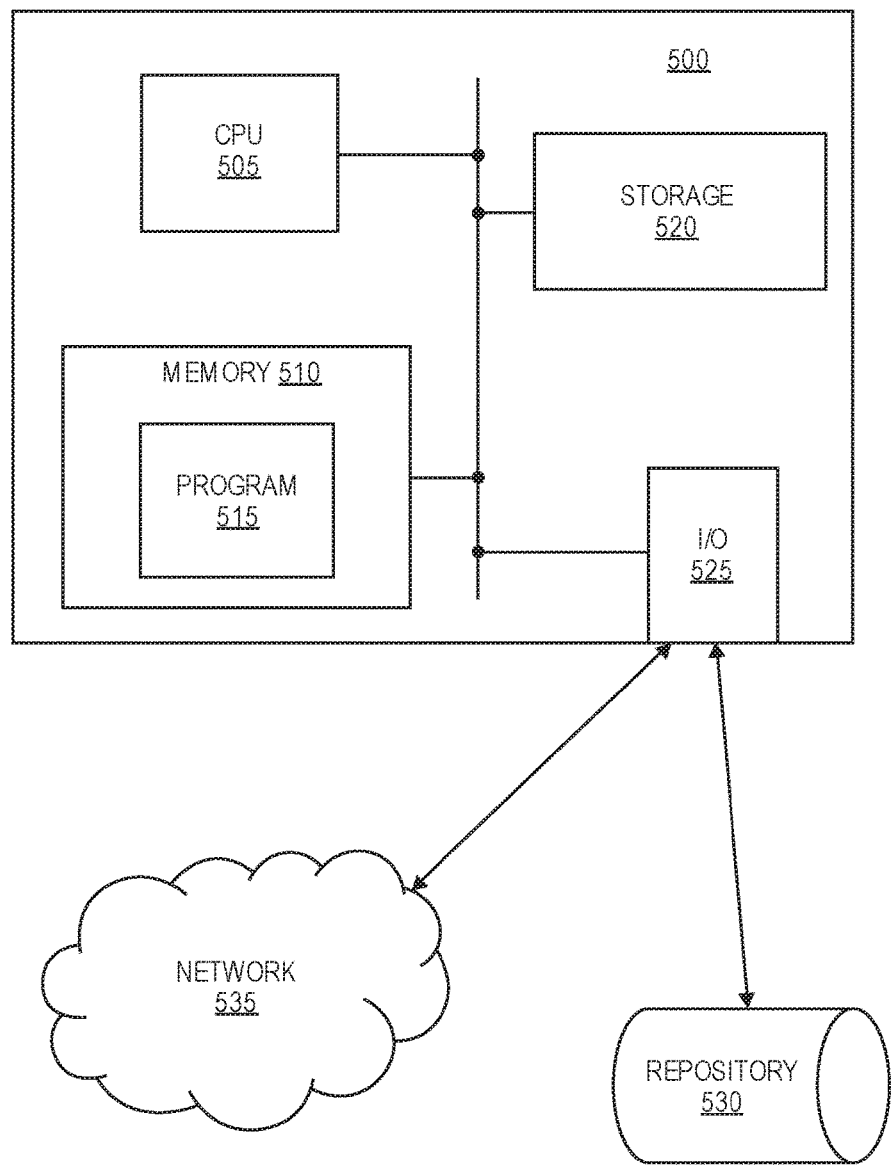
FIG. 5 is a block diagram of an example of a computing system that may be used for hosting or implementing systems and methods consistent with implementations of the invention.

FIG. 5 is a block diagram of an example of a computing environment, which includes a computing system 500 that may be used for implementing systems and methods consistent with implementations of the invention. Other components and/or arrangements may also be used. In some implementations, the computing system 500 may be used to implement, at least partially, various components of FIGS. 1-4, such as the CLA 230 and the MA 210, among other things. In some implementations, a series of computing systems similar to the computing system 500 may be each customized with specialized hardware and/or programmed as a specialized server to implement one of the components of FIGS. 1-4, which may communicate with each other via a network 535.

In the example shown in FIG. 5, the computing system 500 includes a number of components, such as a central processing unit (CPU) 505, a memory 510, an input/output (I/O) device(s) 525, and a nonvolatile storage device 520. The system 500 can be implemented in various ways. For example, an implementation as an integrated platform (such as a server, workstation, personal computer, laptop, etc.) may comprise a CPU 505, a memory 510, a nonvolatile storage 520, and I/O devices 525. In such a configuration, the components 505, 510, 520, and 525 may connect and communicate through a local data bus and may access a data repository 530 (implemented, for example, as a separate database system) via an external I/O connection. The I/O component(s) 525 may connect to external devices through a direct communication link (e.g., a hardwired or local wifi connection), through a network, such as a local area network (LAN) or a wide area network (WAN, such as a cellular telephone network or the Internet), and/or through other suitable connections. The system 500 may be standalone or it may be a subsystem of a larger system.

The CPU 505 may be one or more known processor or processing devices, such as a microprocessor from the Core™ family manufactured by the Intel™ Corporation of Santa Clara, Calif. or a microprocessor from the Athlon™ family manufactured by the AMD™ Corporation of Sunnyvale, Calif. The memory 510 may be one or more fast storage devices (e.g., solid state devices) configured to store instructions and information executed or used by the CPU 505 to perform certain functions, methods, and processes related to implementations of the present invention. The storage 520 may be a volatile or non-volatile, magnetic, semiconductor, tape, optical, or other type of storage device or computer-readable medium, including devices such as CDs and DVDs and solid state devices, meant for long-term storage.

In the illustrated implementation, the memory 510 contains one or more programs or applications 515 loaded from the storage 520 or from a remote system (not shown) that, when executed by the CPU 505, perform various operations, procedures, processes, or methods consistent with the present disclosure. Alternatively, the CPU 505 may execute one or more programs located remotely from the system 500. For example, the system 500 may access one or more remote programs via the network 535 that, when executed, perform functions and processes related to implementations of the present disclosure.

In one implementation, the memory 510 may include a program(s) 515 for performing the specialized functions and operations described herein for the CLA 230 and/or the MA 210. In some implementations, the memory 510 may also include other programs or applications that implement other methods and processes that provide ancillary functionality to the implementations disclosed herein.

The memory 510 may be also be configured with other programs (not shown) unrelated to the invention and/or with an operating system (not shown) that performs several functions well known in the art when executed by the CPU 505. By way of example, the operating system may be Microsoft Windows™, Unix™, Linux™, an Apple Computers™ operating system, or other operating system. The choice of operating system, and even to the use of an operating system, is not critical to the invention.

The I/O device(s) 525 may include one or more input/output devices that allow data to be received and/or transmitted by the system 500. For example, the I/O device 525 may include one or more input devices, such as a keyboard, touch screen, mouse, and the like, that enable data to be input from a user. Further, the I/O device 525 may include one or more output devices, such as a display screen, a CRT monitor, an LCD monitor, a plasma display, a printer, speaker devices, and the like, that enable data to be output or presented to a user. The I/O device 525 may also include one or more digital and/or analog communication input/output devices, such as network cards and USB cards and the like, that allow the computing system 500 to communicate, for example, digitally, with other machines and devices, including via the network 535. Other configurations and/or numbers of input and/or output devices may be incorporated in the I/O device 525.

In the implementation shown, the system 500 is connected to the network 535 (such as the Internet, a private network, a virtual private network, a cellular network or other network or combination of these), which may in turn be connected to various systems and computing machines (not shown), such as servers, personal computers, laptop computers, client devices, etc. In general, the system 500 may input data from external machines and devices and output data to external machines and devices via the network 535.

In the exemplary implementation shown in FIG. 5, the repository 530 is a standalone data storage external to system 500, such as a standalone database. In other implementations, the repository 530 may be hosted by the system 500. In various implementations, the repository 530 may manage and store data used to implement systems and methods consistent with the invention. For example, the repository 530 may manage and store data structures that implement the cloak index table 235, that contain the audit logs of the MA 210 and/or the CLA 230, and the like.

The repository 530 may comprise one or more databases that store information and are accessed and/or managed through the system 500. By way of example, the repository 530 may be an Oracle™ database, a Sybase™ database, or other relational database. Systems and methods consistent with the invention, however, are not limited to separate data structures or databases or particular types of databases, or even to the use of a database or data structure.

One of ordinary skill will recognize that the components and implementation details of the system in FIG. 5 are examples presented for conciseness and clarity of explanation. Other components and implementation details may be used.

Although the foregoing description uses specific examples of computerized devices in the V2X environment 110, such as vehicles, OBUs, ECUs, and RSUs, for clarity of explanation, the invention is not limited to those specific examples. Various implementations consistent with the invention may be used with and for a wide variety of computerized devices, including IoT devices, and additional examples include medical device (e.g., dialysis machines, infusion pumps, etc.); robots; drones; autonomous vehicles; and wireless communication modules (e.g., embedded Universal Integrated Circuit Cards (eUICC)), among others.

Other implementations of the invention will be apparent to those skilled in the art from consideration of the specification and practice of the invention disclosed herein. It is intended that the specification and examples be considered as exemplary only, with a true scope of the invention being indicated by the claims below.

What is claimed is:

1. A system for identifying a misbehaving computerized device, the system comprising:
   a misbehavior authority device; and
   a cloaking authority device that is communicatively connected to the misbehavior authority device;
   wherein the system performs operations comprising:
   receiving, by the misbehavior authority device, a report about the misbehaving computerized device, wherein the report includes a pseudonym certificate from the misbehaving computerized device, and wherein the pseudonym certificate includes a linkage value;
   transmitting, by the misbehavior authority device and to the cloaking authority device, a request for a cloak index, wherein the request for the cloak index includes the linkage value;
   processing, by the cloaking authority device, the linkage value to produce a cloak index, which identifies the misbehaving computerized device;
   transmitting, by the cloaking authority device, the cloak index to the misbehavior authority device;
   receiving, by the misbehavior authority device, the cloak index from the cloaking authority; and
   determining, by the misbehavior authority device and using the cloak index, that a specific computerized device has repeatedly misbehaved.

2. The system of claim 1, the operations further comprising:
   directing, by the misbehavior authority device, a plurality of computerized devices to ignore the specific computerized device that has repeatedly misbehaved.

3. The system of claim 1, wherein processing, by the cloaking authority device, the linkage value to produce the cloak index comprises:
   obtaining, from a pseudonym certificate authority device, first information that is used to produce the cloak index, wherein the information is associated with the linkage value.

4. The system of claim 3, wherein processing, by the cloaking authority device, the linkage value to produce the cloak index comprises:
   obtaining, from a registration authority device, second information that is used to produce the cloak index, wherein the additional information is associated with the first information.

5. The system of claim 1, wherein processing, by the cloaking authority device, the linkage value to produce the cloak index comprises:
   receiving, by the cloaking authority device and from a pseudonym certificate authority device, a hash of a pseudonym certificate request (HPCR) that caused the pseudonym certificate that corresponds to the linkage value to be generated;
   receiving, by the cloaking authority device and from a registration authority device, a hash of a linkage chain identifier that corresponds to the pseudonym certificate identified by the HPCR, wherein the hash of the linkage chain identifier identifies the misbehaving computerized device; and
   determining, by the cloaking authority device, the cloak index, which is based on the linkage chain identifier and which identifies the misbehaving computerized device.

6. The system of claim 1, wherein processing, by the cloaking authority device, the linkage value to produce the cloak index comprises:
   transmitting, by the cloaking authority device and to a pseudonym certificate authority device, a message that includes the linkage value;
   receiving, by the cloaking authority device and from the pseudonym certificate authority device, a message that includes a hash of a pseudonym certificate request (HPCR) that caused the pseudonym certificate to be generated;
   transmitting, by the cloaking authority device and to a registration authority device, a message that includes the HPCR;
   receiving, by the cloaking authority device and from the registration authority device, a message that includes a hash of a linkage chain identifier that corresponds to the pseudonym certificate and that identifies the misbehaving computerized device; and
   determining, by the cloaking authority device, the cloak index, which is based on the linkage chain identifier and which identifies the misbehaving computerized device.

7. The system of claim 1, wherein the computerized device is a vehicle.

8. A method, implemented by a misbehavior authority computer, for identifying a misbehaving computerized device, the method comprising:
   receiving a report about the misbehaving computerized device, wherein the report includes a pseudonym certificate from the misbehaving computerized device, and wherein the pseudonym certificate includes a linkage value;
   transmitting, to a cloaking authority, a request for a cloak index that corresponds to the misbehaving computerized device, wherein the request for the cloak index includes the linkage value from the pseudonym certificate from the misbehaving computerized device;
   wherein the cloaking authority:
   transmits, to a pseudonym certificate authority, a message including the linkage value, wherein the pseudonym certificate authority determines a hash of a pseudonym certificate request (HPCR) that caused the pseudonym certificate to be generated;
   receives, from the pseudonym certificate authority, a message including the HPCR;
   transmits, to a registration authority, a message including the HPCR;
   receives, from the registration authority, a message including a hash of a linkage chain identifier that corresponds to the pseudonym certificate and that identifies the misbehaving computerized device; and
   determines the cloak index, which corresponds to the linkage chain identifier and which identifies the misbehaving computerized device;
   receiving the cloak index from the cloaking authority; and
   determining, using the cloak index, that a specific computerized device has repeatedly misbehaved.

9. The method of claim 8, further comprising:
   directing a plurality of computerized devices to ignore the specific computerized device that has repeatedly misbehaved.

10. The method of claim 8, wherein the cloaking authority determines the cloaking index by creating, using the hash of the linkage chain identifier as a seed in a random number generator, a random number as the cloak index.

11. The method of claim 8, wherein the cloaking authority stores the cloak index that was determined in a cloak index table; and stores the hash of the linkage chain identifier in the cloak index table in association with the cloak index.

12. The method of claim 11, wherein the cloaking authority determines the cloaking index by accessing the cloak index from the cloak index table based on the hash of the linkage chain identifier.

13. The method of claim 8, wherein the computerized device is a vehicle.

14. A system for identifying a misbehaving computerized device, the system comprising:
a memory containing instructions; and
a processor, operably coupled to the memory, that executes the instructions to perform operations comprising:
receiving, from a misbehavior authority, a request for a cloak index that corresponds to the misbehaving computerized device, wherein the request for the cloak index includes a linkage value from a pseudonym certificate from the misbehaving computerized device;
transmitting, to a pseudonym certificate authority, a message including the linkage value, wherein the pseudonym certificate authority determines a hash of a pseudonym certificate request (HPCR) that caused the pseudonym certificate to be generated;
receiving, from the pseudonym certificate authority, a message including the HPCR;
transmitting, to a registration authority, a message including the HPCR;
receiving, from the registration authority, a message including a hash of a linkage chain identifier that corresponds to the pseudonym certificate and that identifies the misbehaving computerized device;
determining the cloak index, which corresponds to the linkage chain identifier and which identifies the misbehaving computerized device; and
transmitting the cloak index to the misbehavior authority.

15. The system of claim 14, wherein determining the cloak index comprises:
creating a random number as the cloak index.

16. The system of claim 15, wherein creating a random number comprises:
creating the random number using the hash of the linkage chain identifier as a seed in a random number generator.

17. The system of claim 14, wherein the operations further comprise:
storing the cloak index that was determined in a cloak index table; and
storing the hash of the linkage chain identifier in a cloak index table in association with the cloak index.

18. The system of claim 17, wherein determining the cloak index comprises:
accessing the cloak index from the cloak index table based on the hash of the linkage chain identifier.

19. The system of claim 17, wherein the operations further comprise:
storing, in the cloak index table, a query time in association with the cloak index and the hash of the linkage chain identifier;
updating the query time whenever the cloak index is accessed; and
deleting the cloak index and the hash of the linkage chain identifier and the query time from the cloak index table after a predetermined amount of time passes after the query time.

20. The system of claim 14, wherein the computerized device is a vehicle.

* * * * *